US006681197B2

United States Patent
Brunner et al.

(10) Patent No.: US 6,681,197 B2
(45) Date of Patent: Jan. 20, 2004

(54) AUTOMATED DATA COLLECTION REPORTING AND ANALYSIS SYSTEM FOR INDUSTRIAL PRODUCTION

(75) Inventors: Steven F. Brunner, Covington, IN (US); Craig A. Smith, Covington, IN (US)

(73) Assignee: The Quaker Oats Company, Chicago, IL (US)

(*) Notice: Subject to any disclaimer, the term of this patent is extended or adjusted under 35 U.S.C. 154(b) by 196 days.

(21) Appl. No.: 09/755,776

(22) Filed: Jan. 5, 2001

(65) Prior Publication Data

US 2002/0091498 A1 Jul. 11, 2002

(51) Int. Cl.$^7$ ............................................... G06F 15/20
(52) U.S. Cl. ..................... 702/182; 702/16; 702/183; 702/184; 702/186
(58) Field of Search .................. 702/16, 127, 182–187, 702/189, FOR 104, FOR 135–137, FOR 154–155, FOR 159–160, FOR 170–771; 340/3.9; 705/7, 11, 8, 9, 10, 32; 700/1.8

(56) References Cited

U.S. PATENT DOCUMENTS

| 5,134,574 | A | * | 7/1992 | Beaverstock et al. ......... 702/84 |
| 5,396,432 | A | * | 3/1995 | Saka et al. ................... 700/111 |
| 5,446,895 | A | | 8/1995 | White et al. ................. 395/650 |
| 5,461,570 | A | * | 10/1995 | Wang et al. ................. 700/110 |
| 5,586,021 | A | | 12/1996 | Fargher et al. ........ 364/468.06 |
| 5,715,181 | A | * | 2/1998 | Horst ......................... 702/180 |
| 5,729,746 | A | | 3/1998 | Leonard ..................... 395/701 |
| 5,737,727 | A | | 4/1998 | Lehmann et al. ............... 705/7 |
| 5,754,450 | A | * | 5/1998 | Solomon et al. .............. 702/35 |
| 5,771,179 | A | | 6/1998 | White et al. ........... 364/551.01 |
| 5,896,292 | A | * | 4/1999 | Hosaka et al. .............. 700/108 |
| 5,909,669 | A | | 6/1999 | Havens ........................ 705/11 |
| 5,954,510 | A | | 9/1999 | Merrill et al. .............. 434/236 |
| 6,070,143 | A | | 5/2000 | Barney et al. ................. 705/8 |
| 6,073,138 | A | | 6/2000 | de l'Etraz et al. .......... 707/104 |
| 6,101,481 | A | | 8/2000 | Miller ............................ 705/9 |
| 6,119,097 | A | | 9/2000 | Ibarra ......................... 705/11 |

* cited by examiner

Primary Examiner—Marc S. Hoff
Assistant Examiner—Carol S Tsai
(74) Attorney, Agent, or Firm—Lars S. Johnson; James D. Ryndak (57) ABSTRACT

An automated system and method for developing an increased level of associate accountability in a production process by obtaining a performance projection from the associate, inputting this projection data into a computer system, obtaining and inputting actual performance data into the system and utilizing the system to compare the associate's projected performance to the associate's actual performance. The system and method of the present invention provides timely, objective and quantitative feedback to the production process associate. This feedback is subsequently used as a pay for performance incentive program.

51 Claims, 6 Drawing Sheets

AUTOMATED DATA COLLECTION REPORTING AND ANALYSIS SYSTEM FOR INDUSTRIAL PRODUCTION

FIELD OF THE INVENTION

The invention relates to an automated system and method for monitoring an employee's performance in a production process and, in particular, to a system and method for providing direct employee accountability for the production process.

BACKGROUND OF THE INVENTION

The performance of the production line associate, namely one individual or a group of individuals who are responsible for accomplishing the daily tasks of a production process, is commonly known to be integral to the overall success of the production organization. Much research, study and effort have focused on how to improve an associate's productivity. Many management and organizational behavior theories emphasize that the key to increased associate performance is to create a work environment wherein the associate working on the production line carries a high degree of responsibility in ensuring that production of the complete product occurs smoothly, efficiently and successfully.

An approach currently pursued by organizations striving to create higher associate performance levels is the High Performance Organization (HPO). HPOs emphasize associate autonomy and the need for individual responsibility in the overall performance of the organization. HPOs are further characterized by a high degree of associate empowerment. Associates in HPOs control the pace of their own work, as well as determine the work that they want to perform. Associates make their own work assignments, create their own schedules and determine their own work procedures. HPO managers regularly provide feedback on how associates are performing. The practical goal of the HPO is to empower an associate or a team of associates to accomplish the organization's day-to-day production operations without management intervention.

Myriad difficulties face the organization attempting to incorporate the HPO paradigm into the real-world work environment. Granted, the goal of the HPO is to empower associates so they can control the pace of their own work yet managers are often necessary to formulate work assignments. An organization may claim that associates decide what work they want to perform but supervisors are still required to ensure that the day-to-day production operations are successfully completed. The current layers of management are oftentimes so thick in an organization that feedback between managers and associates is stifled or delayed. Moreover, an organization's information systems may be outdated or simply not adapted to allow associates to readily share important production data. Factors such as these impede the associate from developing a sense of personal responsibility for the overall performance of the organization.

A need therefore exists for a practical, efficient and effective way to make an associate more accountable for the successful operation of the production process and in an objective manner. A need correspondingly exists to significantly reduce or remove altogether management from the daily production process to empower an associate to become more accountable for the day-to-day operation of an organization's production process.

SUMMARY OF THE INVENTION

The present invention links technology with the high performance culture to empower fully an associate in the performance of an organization's production process. In accordance with the present invention, a computerized method is provided for obtaining a performance projection from an associate, inputting this projection into computer memory, obtaining actual performance data that corresponds to the associate's actual performance in the production process, inputting this data into computer memory, and comparing the associate's projected performance data with his actual performance data. In so doing, the computerized system and method of the present invention can place total accountability on the associate for the day-to-day operation of the production process and can do so in an objective manner, thereby eliminating the need for the traditional first-level production manager.

In accordance with another embodiment of the invention, the projected performance data and the actual production performance data is rate of production data, production quality data, or process quality data.

In accordance with another embodiment of the invention, actual production data is obtained and inputted automatically on a real-time basis.

In accordance with another embodiment of the present invention, the associate's projected performance data is periodically updated and input into computer memory.

In accordance with another embodiment of the invention, a scorecard is generated reporting the comparison between the associate's production performance projection and the associate's actual production performance.

In accordance with another embodiment of the present invention, the associate's actual performance data is compared to his projected performance and a scorecard is generated and periodically updated as actual performance data is updated.

In accordance with another embodiment of the invention, a computerized method is provided for obtaining a performance projection from a plurality of associates, inputting this projection into computer memory, obtaining actual performance data that corresponds to the associates' actual performance in the production process, inputting this data into computer memory, and comparing the associates' projected performance data with their actual performance data.

In another embodiment of the invention, a scorecard is generated reporting the comparison between a plurality of associates' production performance projection and the plurality of associates' actual production performance.

In another embodiment of the present invention, a system for monitoring the performance of a production process is provided comprising computer memory for storing data, computer input means for an associate to input production performance projection data into computer memory, means to obtain actual production data, means to input actual production performance data into computer memory and means to compare the production performance projection data with the actual production performance data.

In another embodiment of the present invention, the means for inputting production performance projection data and actual production data comprises a computer terminal.

In another embodiment of the present invention, actual production data is obtained automatically by a production data collecting device on a real-time basis.

In another embodiment of the present invention, the data collecting device is configured to collect rate of production data, production quality data, or process quality data.

In another embodiment of the present invention, the system comprises structure to report the comparison between the actual production data and the production performance projection.

In another embodiment of the present invention, the system comprises structure to graphically output the comparison between the actual production data and the production performance projection.

In another embodiment of the present invention, the system comprises structure for comparing previous actual performance data with current performance data.

DETAILED DESCRIPTION OF THE EMBODIMENTS

Figure 1:
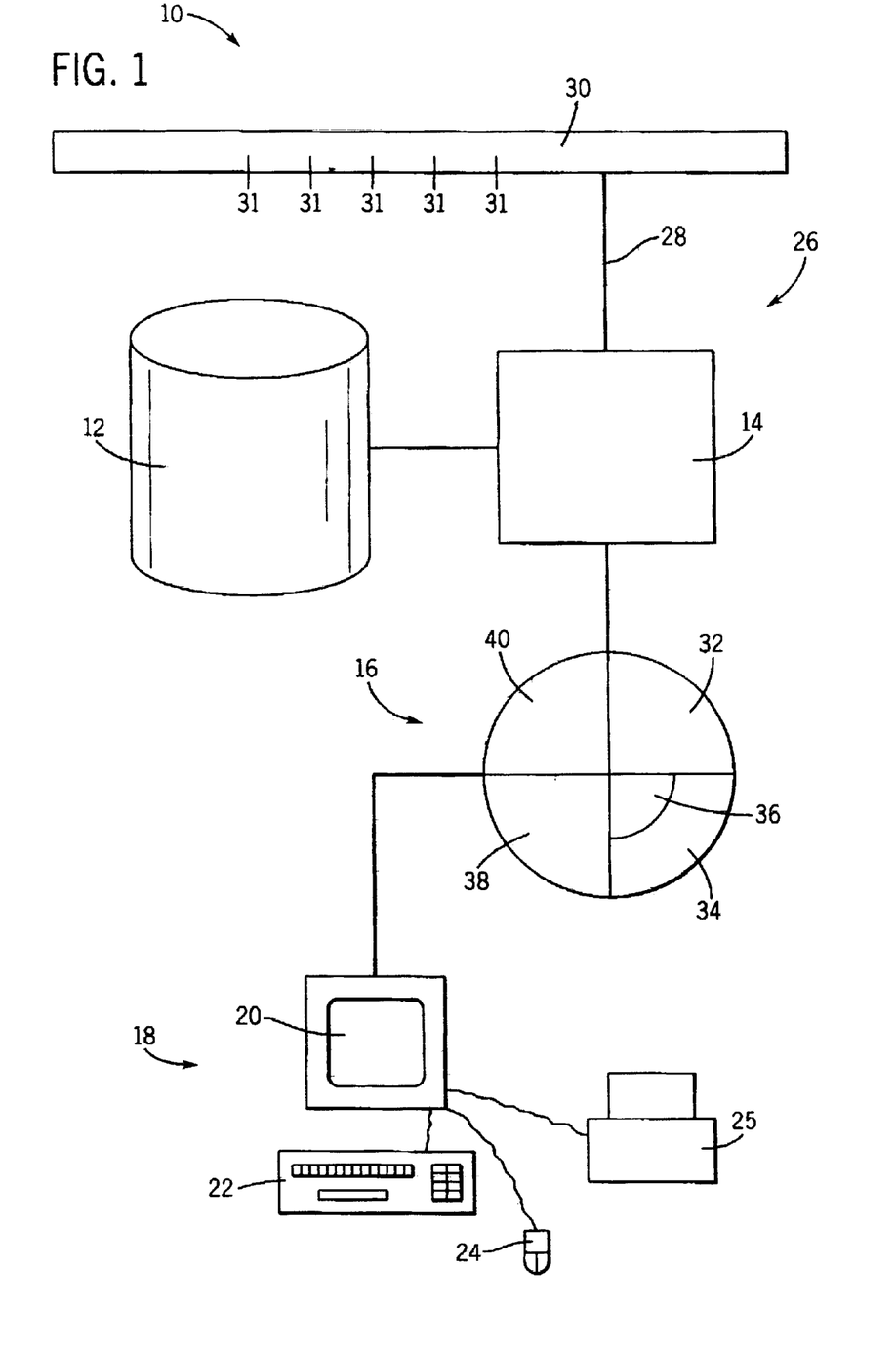
FIG. 1 is a block diagram of a system in accordance with the present invention.

Referring to the Figures generally, where like reference numerals denote like structure and elements, and in particular to FIG. 1 wherein a system for monitoring the performance of a production process 10 is depicted in accordance with the present invention. System 10 includes a relational database 12 for storing data, a processor 14 for processing data, a computer terminal 18 and a modular interface 16 connecting computer terminal 18 with processor 14. Computer terminal 18 includes a display device 20 preferably with a graphical user interface, a keyboard 22, a computer mouse 24, and a printer 25. Modular interface 16 provides interactivity between system 10 and a user. Modular interface 16 provides a user the ability to input data into database 12 from computer terminal 18. Modular interface 16 also enables a user to display data stored in database 12 on computer terminal 18. The system for monitoring the performance of a production process 10 may be run on a stand-alone computer or a workstation. Preferably, system 10 is a computer network wherein database 12 is a common database connected to a plurality of computer terminals 18. In this sense, system 10 may be configured as a local area network or a wide area network or any other suitable networked configuration whereby the data stored in database 12 is accessible to a plurality of users. In an alternate embodiment, system 10 is configured as a distributed network wherein database 12 is remotely located relative to the locations of the plurality of computer terminals 18. In this embodiment, database 12 is connected to a plurality of computer terminals via the Internet, telephone or cable line, satellite link or any other suitable telecommunications interconnection.

Figure 2:
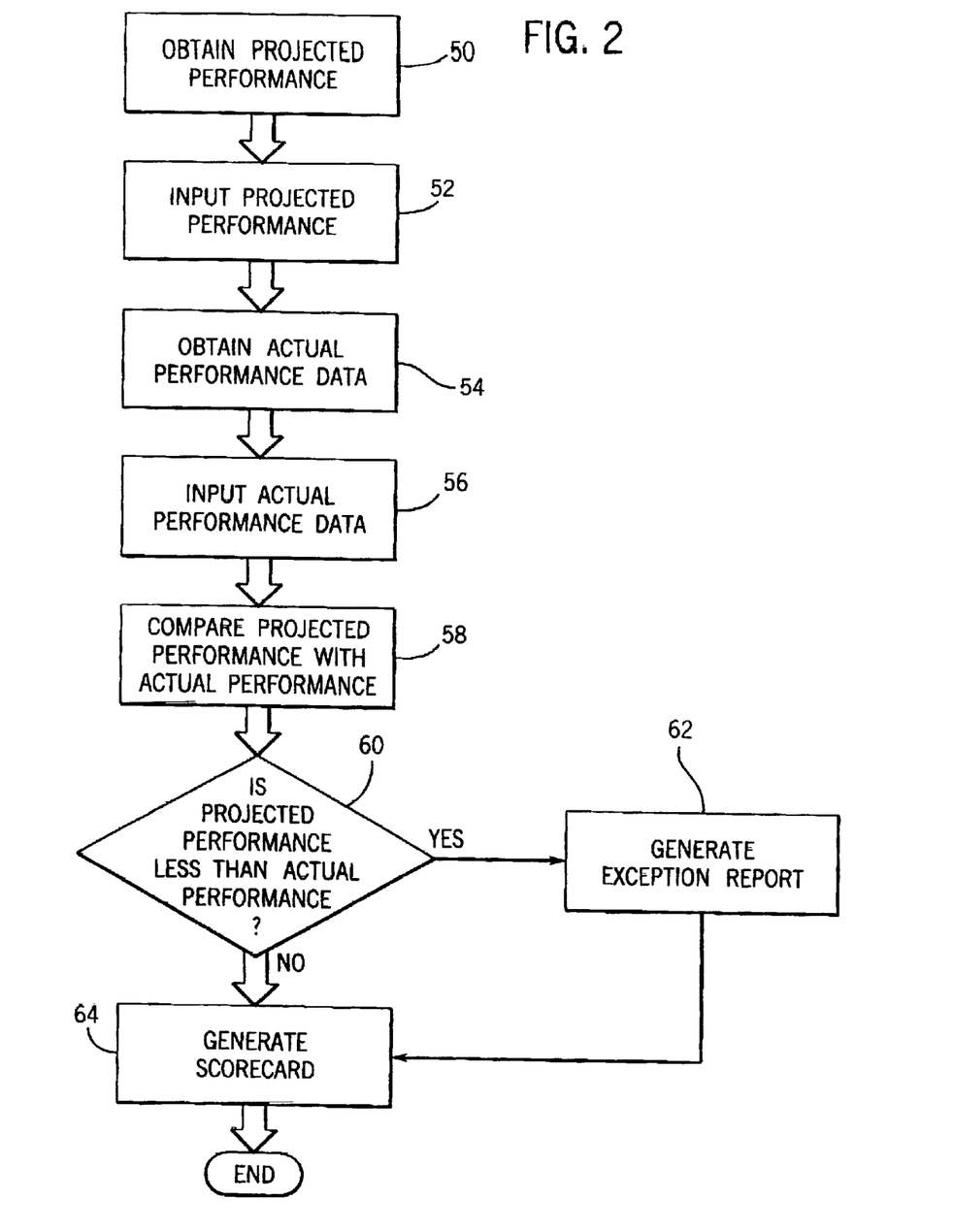
FIG. 2 is a flowchart illustrating the steps involved in a method in accordance with the present invention.

The sequential steps involved in utilizing system 10 to monitor the performance of a production process are illustrated in flowchart format in FIG. 2. A user, preferably an employee with responsibility for the production process and hereafter referred to as an associate, initially obtains a production performance projection in step 50. This performance projection is a prediction of what the associate intends to produce during a specified future time duration. The time duration for the performance projection is specified by the associate. Such time durations include but are not limited to a shift, a day, a week, a month, three months, six months, nine months or a year. Preferably, the production performance projection is for 90 days. In formulating this production performance projection, it is to be understood that the associate requires and has access to past production and/or process quality information in order to make the projection meaningful. This information can come from historical production data maintained at the associate's production facility, trade journals, government regulations, industry standards and the like.

In an alternate embodiment of the present invention, system 10 collects production data automatically by further comprising daily data collection system 26 comprising relational database 12 and processor 14 connected by link 28 to production line 30 having a plurality of data collection points 31 as shown in FIG. 1. Link 28 may be any suitable cable or wire connection that allows passage of electronic data between data collection points 31 and processor 14. Alternatively, link 28 may be a radio frequency connection wherein data collection points 31 are operatively connected to a transmitter that transmits the production data to a radio frequency receiver operatively connected to processor 14.

Processor 14 retrieves production data from data collection points 31 along production line 30 through link 28. Production data from production line 30 can be retrieved by processor 14 at any user defined time interval. Processor 14 preferably retrieves production data from production line 30 every thirty minutes. The data collected from production line 30 may include both production data and process quality data. For example, data collected by daily data collection system 26 can include but is not limited to production line uptime, system rate, cases produced, overall yield, product loss at start-up, product loss at shut-down, by-product, remill, product quality, overpack, start-up, product changeovers, size changeovers, cleanup, downtime, case count, and reason for downtime. Daily reporting system 26 can also be configured to collect any type of production-related data, including but not limited to, rate of production data, product quality data, product running conditions, process quality data, personnel and staffing data and safety data. Preferably, daily reporting system 26 is configured to collect the following six key performance indicators from production line 30: yield, operating hours, uptime, system rate, first pass quality, and safety data.

It is to be understood that daily data collection system 26 may also include relational database 12 and processor 14 remotely connected to a plurality of production lines 30. In this situation, database 12 and processor 14 may be connected to the plurality of production lines 30 by a distributed network. The distributed network connects database 12 and processor 14 to a plurality of production lines 30 via the Internet, telephone or cable line, satellite link or any other suitable telecommunications interconnection. Alternatively, any other type of computer network or other connecting structure can be employed in accordance with the invention.

Links 28 operatively connect processor 14 to data collection points 31 located at designated areas along production line 30. For example, the "product loss at start-up" data collection point is located in the processing area typically located near the beginning of the production line; whereas the "cases produced" data collection point is located in the packaging area typically located near the end of the production line. After retrieving the data, processor 14 sorts and stores this data with each data collection point having its own storage space in database 12.

The associate preferably obtains his production performance projection in step 50 of FIG. 2 by evaluating the data collected automatically by daily data collection system 26. An alternate embodiment of the present invention further includes modular interface 16 having forecasting module 32, accountability module 34, human connection module 36 further comprising shift-to-shift communications module 38 and information display module 40 as shown in FIG. 1. By selecting information display module 40 from computer terminal 18, the associate has the ability to view the data collected by daily data collection system 26 on display device 20.

Figure 3:
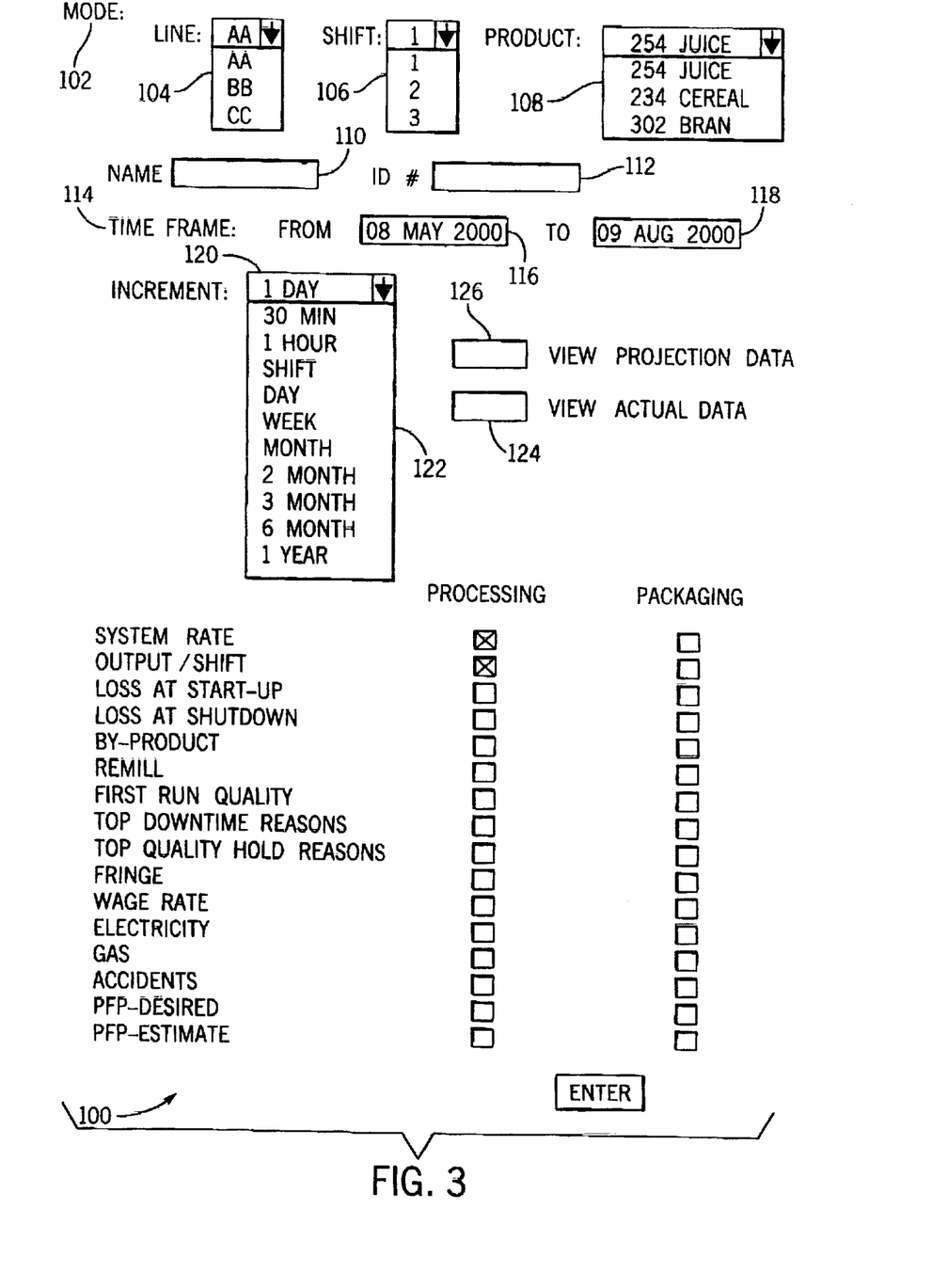
FIG. 3 is a screen snapshot of the information display data entry screen.

As is shown in FIG. 3, input screen 100 for information display module 40 provides enormous versatility for how and what type of data is to be displayed. Preferably, input screen 100 is a windows-based application. At the top of input screen 100, is mode row 102. Here, the associate selects from which production line 104, shift 106 and product 108 displayed data is to be drawn from database 12. Below mode row 102, are entry fields for the associate's name 110 and identification number 112. Proceeding downward on input screen 100, the associate specifies a time range for which data is to be displayed at time frame row 114. The associate enters a start date in start date entry field 116 and a stop date in the stop date entry field 118. Next, the associate selects the time increment for which data is to be displayed by selecting a value in the increment entry field 120. This time increment can range from 30 minutes to one year as shown by the contents of the increment drop-down box 122.

In the lower portion of input screen 100, the associate selects which data points to display. Input screen 100 allows the associate to select for viewing any combination of data points collected by daily data collection system 26. Information display module 40 has the capability to display historical data for a plurality of data points. As such, it can be observed that the data points "output/shift" and "system rate" are selected for display on input screen 100. It should be noted however, that FIG. 3 is merely an example for the arrangement of input screen 100. Input screen 100 can be configured to include data entry fields for any type of production process. Moreover, information display module 40 is also capable of displaying data entered manually into the system including projected performance data as will be explained more fully later.

Figure 4:
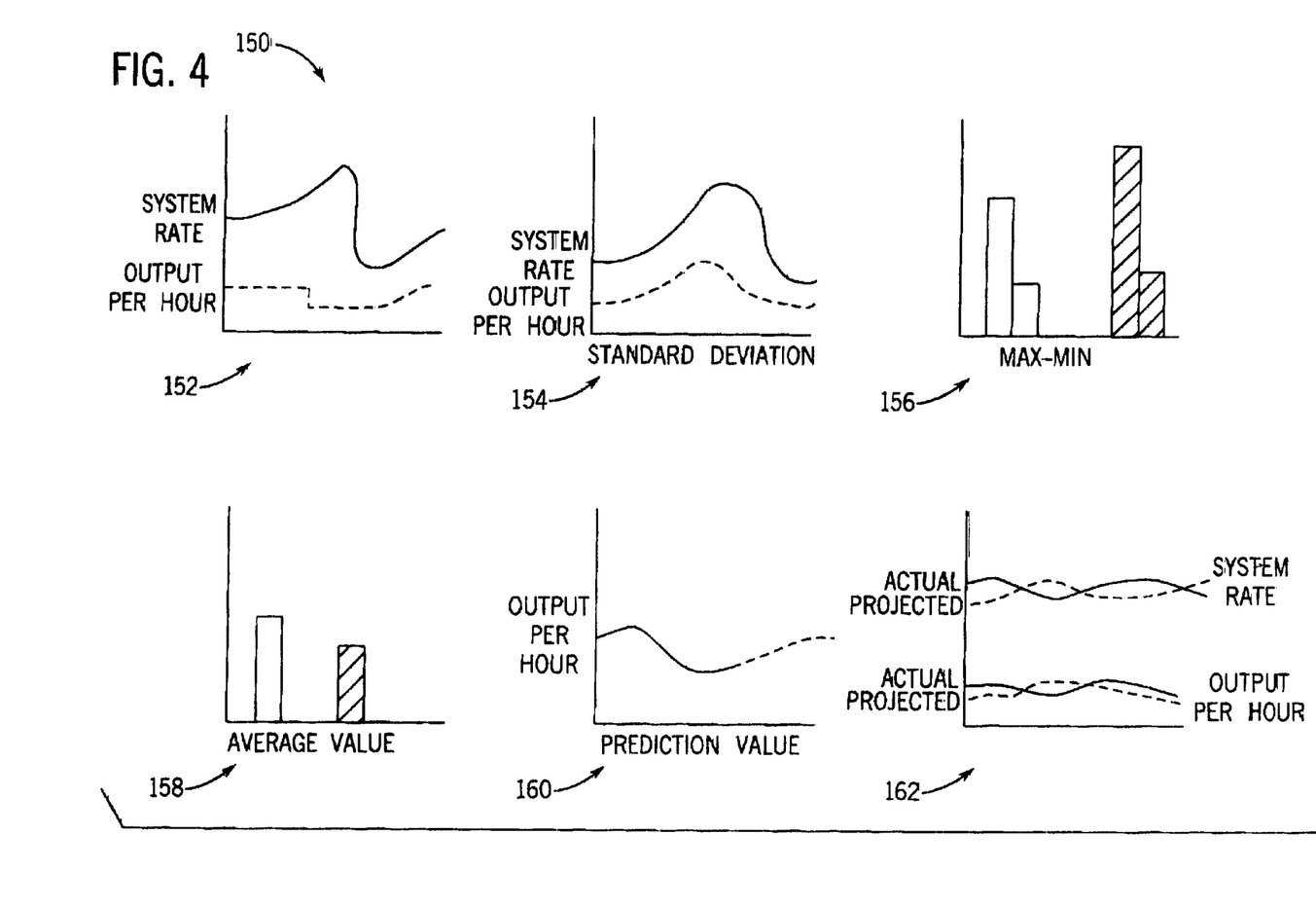
FIG. 4 is a screen snapshot of a graphical display screen showing the data entered in FIG. 3 in graphical format.

Information display module 40 takes the associate's selections from input screen 100, sends these selections to processor 14 which correspondingly retrieves the selected data points from database 12. Information display module 40 then displays this data graphically on information display screen 150 as shown in FIG. 4. Information display screen 150 can display data from daily data collection system 26 as well as manually inputted data entered in other modules. Information display screen 150 is capable of displaying a plurality of graphs simultaneously. Each graph also has the capability to display a plurality of data sets. For example, the two selected data sets from input screen 100 "system rate" and "output/hr" are both displayed on graph 152. Information display module also has the capability to graph standard deviation as shown in graph 154, data set maximum and minimum values as in graph 156, and the average value for a data set shown in graph 158. Information display module 40 can also incorporate trend lines in all graphs. Information display module 40 has the further capability to predict and display future values for a data set based on an analysis of historic trends in any selected data set. This future value is depicted as the dotted line portion of graph 160. Preferably, the associate evaluates this predicted value when obtaining a production performance projection in step 50. All data or graphs displayed by information display module 40 can be printed on printer 25.

Figure 5:
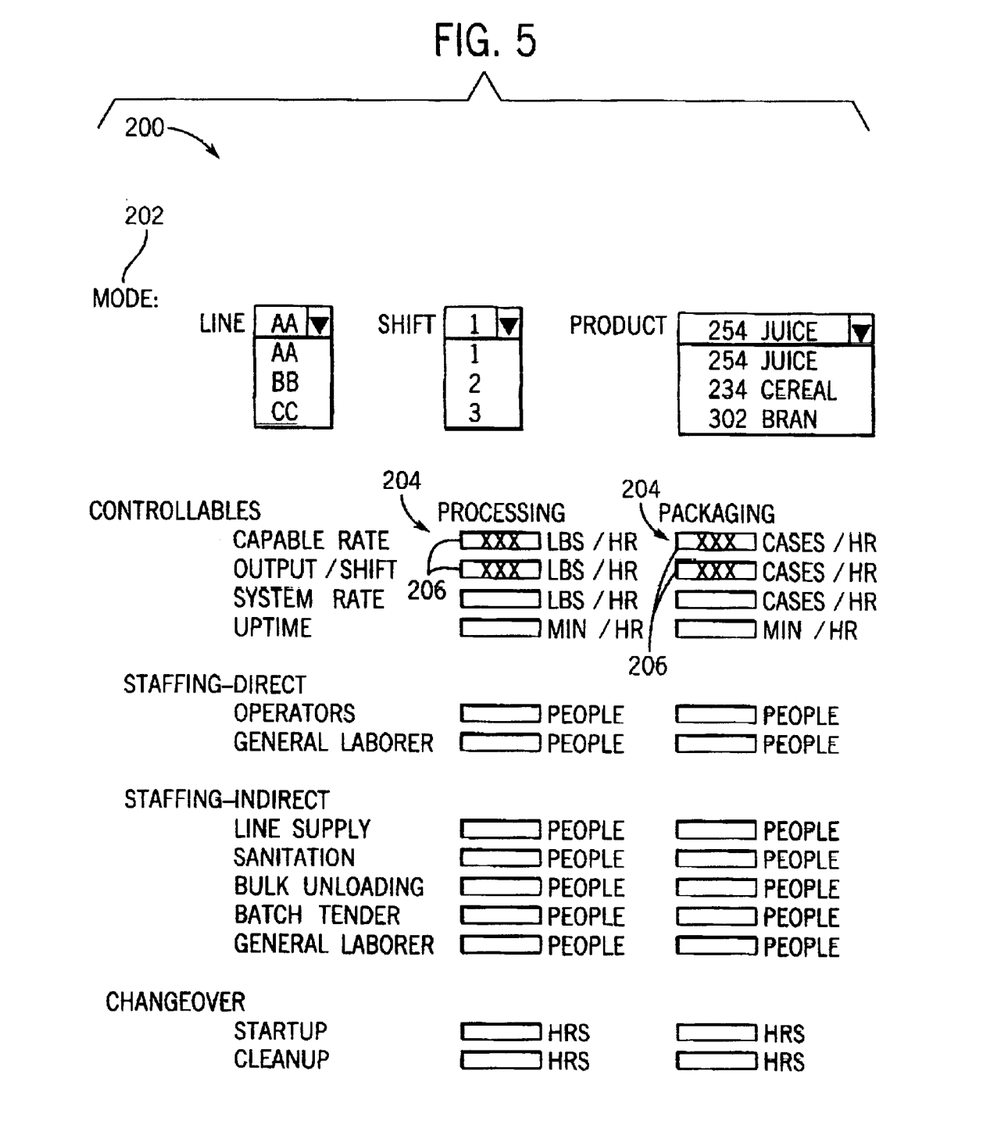
FIGS. 5 and 5a are a screen snapshot of the data entry screen for the forecasting module.
Figure 5A:
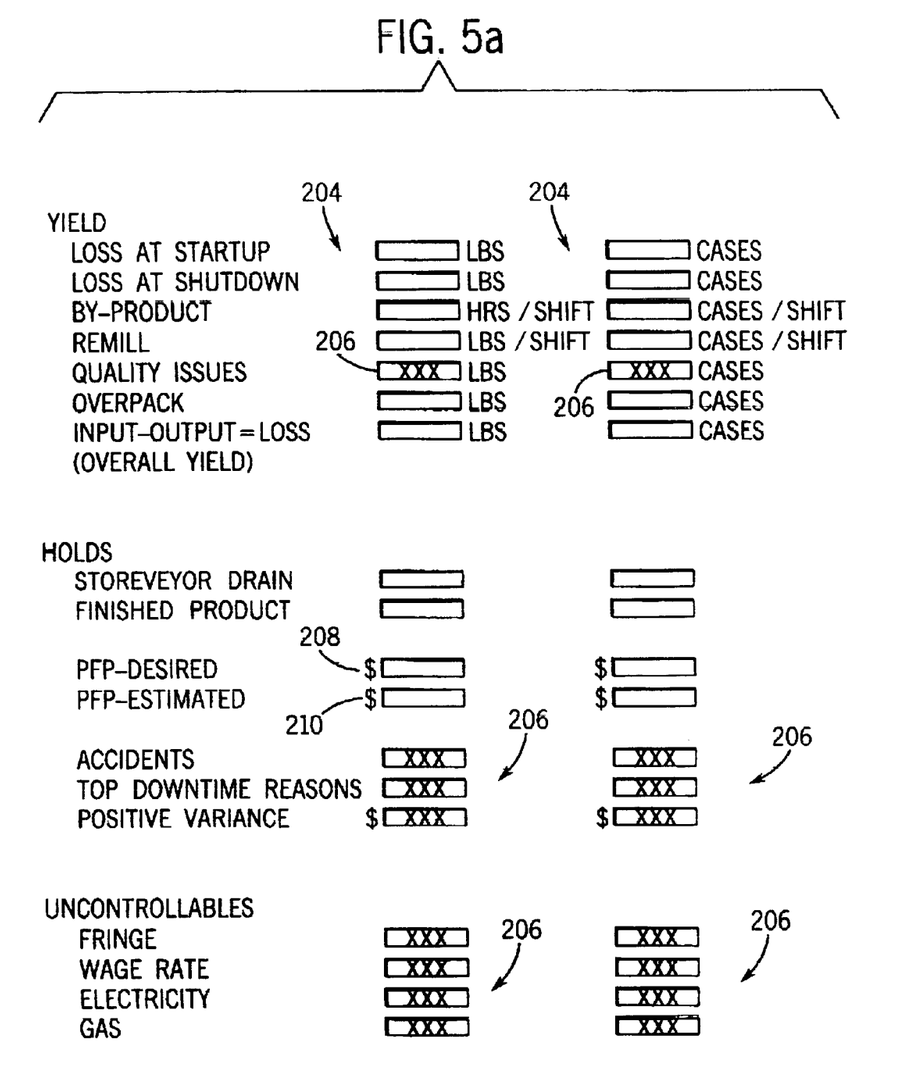

Once the production performance projection is obtained, this projection data is then input into system 10 as shown in step 52 of FIG. 2. Anyone designated by the organization may input this data into system 10 including, but not limited to, data entry personnel, human resource personnel or management personnel. The performance projection may encompass any future time duration ranging from a shift to a year. Preferably, the associate uses forecasting module 32 to input a ninety-day performance projection as shown in FIGS. 5 and 5a. When the associate selects forecasting module 32, forecast input screen 200 is displayed on display device 20. Forecast input screen 200 can be configured to accept performance projection data for any type of production process. In the current example, forecast input screen 200 is configured to accept performance projections for a food production process. It should be realized, however, that the system and method of the present invention is equally applicable to any production process, not merely a food preparation and packaging process. Hence, the data templates of forecast input screen 200 can be suitably modified as needed.

Mode selection 202 allows the associate to input a performance projection based on production line, product or shift. Below mode selection 202, the projection entry fields 204 are arranged in columns for both processing and packaging phases of the production process. Projection entry fields 204 are further arranged in the following categories: controllables, staffing, changeover, yield, holds, pay for performance, safety and uncontrollables. The associate proceeds through input display screen 200 and enters his projections in each category for both the processing and packaging phases of the production process. If the associate is uncertain as to what values are acceptable inputs, forecasting module 32 includes a worksheet with formulas to instruct an associate as to the appropriate ranges for a given entry field. Forecasting module 32 can be configured so that only a member of management determines the input values for certain entry fields as shown by x-filled entry fields 206. In the event the associate inputs a value below the threshold value set by management, forecasting module 32 rejects the input for that entry field.

Pay for performance or PFP is a paycheck bonus awarded to the associate for positive performance. PFP desired entry field 208 is the field in which the associate enters his desired pay for performance. PFP estimated entry field 210 is the field in which the associate enters his expected pay for performance. The cornerstone of the present invention lies in this concept of pay for performance. By giving the associate access to production data (preferably production data collected automatically) to make a production performance projection combined with rewarding the associate for positive performance and holding the associate accountable for negative performance, total accountability for the production process is provided to the associate. By inputting values into PFP desired entry field 208 and PFP estimated entry field 210, the associate is undertaking an active role in the overall success of the production process.

In an alternate embodiment, the associate inputs a percent improvement factor rather than inputting values for all projection entry fields 204. Forecasting module 32 subsequently calculates corresponding values for each individual entry field necessary to reach the desired overall percent improvement level. In another embodiment of the present invention, the associate enters a dollar amount that the associate desires to be paid for his performance in PFP desired entry field 208. Forecasting module 32 then calculates values for all the entry fields based on this desired pay. This provides the associate with a model as to how to obtain a higher level of pay. In yet another embodiment of the present invention, inputs for projection entry fields 204 can be designated for an individual associate or a team of associates.

After data is entered in forecast input screen 200, processor 14 processes this projection data and stores it in database 12. Once the projection period is underway, the associate's performance projection data cannot be modified. The associate thereby proceeds to undertake his daily production tasks and responsibilities with an effort toward obtaining his projected performance. It is to be understood that the associate logs or otherwise records his daily production results. This can be done by writing daily production results in a logbook, a summary sheet or any suitable recording documentation. Preferably, the associate's production results are collected automatically by daily data collection system 26.

Human connection module 36 collects other production-related information during the projection period. When the associate begins a shift, the associate enters his time-in in human connection module 36. Likewise, when the associate leaves work at the end of the shift, he enters his time-out in human connection module 36. Any absenteeism or tardiness is similarly inputted into human connection module 36. Human connection module 36 further ensures associate accountability by monitoring and linking each associate to a particular production line or process within the production facility. Whenever an associate transfers job duties, the associate enters this change in human connection module 36. An associate may begin by working on the processing phase of a production line and as production proceeds, move to the packaging phase. In this example, the associate would enter this transfer from the process phase to the packaging phase in human control module 36.

Human connection module 36 further comprises shift-to-shift communications module 38. During production, inter-shift communication is necessary to avoid redundancy and to maintain congruent data collection. By selecting shift-to-shift communications module 38 from computer terminal 18, an associate from one shift passes information such as, but not limited to, system rate, output per hour, first run quality and loss at startup to the succeeding shift. Data conveyed through shift-to-shift communications module 38 is stored in database 12. Preferably, the key performance indicators including, but not limited to, yield, operating hours, uptime, system rate, first pass quality and safety are communicated from the current shift to the succeeding shift by way of shift-to-shift communications module 38.

Once the projection period lapses, the actual performance data is obtained as is shown in step 54 of FIG. 2. Preferably, the projection period is ninety days in duration. The associate's actual performance data may be obtained by manually retrieving and compiling the associate's production recordation documentation. Preferably, the actual performance data is obtained automatically from data collection points 31 along production line 30 by daily data collection system 26.

The actual performance data is then entered into system 10 as depicted in step 56 of FIG. 2. Actual production data maintained in production logbooks or in other suitable production recordation documents is entered manually into system 10 by an associate using computer terminal 18. Preferably, daily data collection system 26 automatically stores the actual production data in database 12 after collecting said data from data collection points 31 along production line 30.

The actual production data is then compared to the associate's production performance projection as shown in step 58 of FIG. 2. From computer terminal 18, the associate selects accountability module 34. The associate enters the time span of interest typically corresponding to the projection period of 90 days. The associate can choose certain data points to view similar to input screen 100 of information display module 40. Processor 14 retrieves the actual production data and production performance projection data for the selected time span and selected data points from database 12.

Accountability module 34 then compares the associate's projected performance data with the actual performance data and determines the relation of the actual performance data to the projected performance data. From this relation, accountability module 34 assesses whether the associate's actual performance matched or exceeded the associate's projected performance as shown in step 60 of FIG. 2. The associate may view a graphical representation of this comparison data by selecting information display module 40. On input screen 100, the associate can select any combination of data points to view. Similarly, by selecting view actual production data field 124 and view projected production data field 126, the associate can view actual and projected production data on the same graph as shown in graph 162 of FIG. 4

In the event the associate's actual performance does not match or exceed his projected performance, an exception report is generated by accountability module 34 as shown in step 62 of FIG. 2. The exception report identifies the data sets wherein the projected performance data did not meet actual performance data. Human connection data such as absenteeism or increased tardiness may also be included in the exception report. It is understood that unforeseen events such as a power outage or equipment failure may cause an associate's projected performance to fall short of actual performance. Accountability module 34 can be configured to either include or not include unforeseen events in exception reporting step 62 according to management discretion.

Preferably, accountability module 34 incorporates procedures that are triggered automatically when projected performance falls below actual performance. Such automatic procedures may include but are not limited to automatically recommended and selected action for the various types of negotiated behavior, including in the exception report any history of prior negotiated behavior, and an "action/no action" report for management personnel. All reports data or graphs generated by accountability module 34 can be printed on printer 25.

Regardless of whether an exception report is generated, accountability module 34 compiles the relational data between the actual production data and the projected performance values for each associate and generates a scorecard with this information as shown in step 64 of FIG. 2. Production data on the scorecard may include but is not limited to: product running conditions including first-run quality; safety and sanitation; yield for both processing and packaging; case output; production line uptime; system rate; production line operating hours; and production line downtime. Also included on the scorecard is pay for performance information. When the associate's actual performance meets or exceeds his projected performance, accountability module 34 calculates a monetary bonus for the associate. This bonus can be constant providing the same bonus regardless of the amount by which the associate exceeds his performance projection. Alternatively, the pay for performance bonus may be adjustable to reward exceptional associate performance in the event an associate's actual production dramatically exceeds his projected performance.

As the final link in the accountability chain, the generation of the scorecard by accountability module 34 carries several advantages. The theory behind the concept of pay for performance is to provide the associate with the incentive to meet and/or exceed his performance projection. As the scorecard is generated at the end of each projection period, the associate expects and receives feedback at regular intervals. The scorecard reports quantitative data on the associate's performance. As such, this feedback is objective with the scorecards maintaining consistent, fair and equal evaluation of an associate's performance.

In one embodiment, the present invention is intended to be utilized consistently and repeatedly and can be operated on a real time and/or continuous basis. As such, the system and method herein described establish a continuous improvement cycle in the production process. Connecting automated production data collection with the empowerment of the associate to select his own performance goals and rewards provides a production environment wherein total accountability resides with the associate. This total associate accountability for the production process provides ever-greater production yields while simultaneously eliminating the need for first-level production supervisors.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A computerized method of determining the quality of an employee's performance which employee has responsibility for the performance of a production process comprising:

obtaining an employee projected performance data for the production process generated by at least one employee with responsibility for the production process corresponding to projected process performance;

inputting the employee projected performance data corresponding to projected process performance into computer memory;

obtaining actual performance data for the production process corresponding to the actual performance of the process;

inputting the actual performance data into computer memory; and comparing with a computer the inputted employee projected performance data from the employee with the actual performance data to determine an objective relation of the actual performance of the process to the projected performance of the process that is suitable for determining whether to reward the employee for a positive process performance data relative to the projective performance or to hold the employee accountable for a negative process performance relative to the projective performance data.

2. The method of claim 1 wherein the projected performance data and actual performance data is rate of production data.

3. The method of claim 1 wherein the projected performance data and actual performance data is product quality data.

4. The method of claim 1 wherein the projected performance data and actual performance data is process quality data.

5. The method of claim 1 wherein each of the employee projected performance data and actual performance data includes data selected from the group consisting of production line uptime, system rate, cases produced, overall yield, product loss at start-up, product loss at shut-down, by-product, remill, product quality, overpack, start-up, product changeovers, size changeovers, cleanup, downtime, case count, reason for downtime, rate of production data, product quality data, product running conditions, process quality data, personnel and staffing data, safety data, uptime data, overall yield data, loss at startup data, loss at shutdown data, product waste data, cleanup data and combinations thereof.

6. The method of claim 1 wherein the actual performance data is obtained by automated data collecting.

7. The method of claim 6 wherein the inputting of actual performance data is automated.

8. The method of claim 1 wherein the actual performance data collecting and inputting is performed on a real-time basis.

9. The method of claim 8 further comprising periodically updating the projected performance data and inputting the updated projected performance data into computer memory.

10. The method of claim 1 further comprising generating an employee scorecard based on the comparing step.

11. The method of claim 10 further comprising periodically updating the comparing step and the generating step based on updated actual performance data.

12. The method of claim 1 wherein the objective relation includes employee pay for process performance data.

13. A computerized method of determining the quality of an employee's performance which employee has responsibility for the performance of a production process comprising:

obtaining employee projected performance data for a production process generated by each of a plurality of employees, each having different responsibility in the production process;

inputting the projected performance data into computer memory;

obtaining actual performance data for the production process, said actual performance data comparable to the projected performance data;

inputting the actual performance data into computer memory; and comparing with a computer the inputted employee projected performance data with the actual performance data to determine an objective relation of the actual performance of the process to the projected performance of the process that is suitable for determining whether to reward any of the employees for a positive process performance relative to the employee projected performance data or to hold any of the employees accountable for a negative process performance relative to the employee projected performance data.

14. The method of claim 13 further comprising generating an employee scorecard based on the comparing step, for each of a plurality of employees who generated projected performance data.

15. The method of claim 1 wherein each of the projected performance data and actual performance data includes data selected from at least one of rate of production data, product quality data, process quality data, uptime data, overall yield data, loss at startup data, loss at shutdown data, product waste data, and cleanup data.

16. The method of claim 13 wherein the actual performance data is obtained by automated data collecting.

17. The method of claim 16 wherein the inputting of actual performance data is automated.

18. The method of claim 13 wherein the actual performance data collecting and inputting is performed on a real time basis.

19. The method of claim 18 further comprising periodically updating the projected performance data and inputting the updated projected performance data into computer memory.

20. The method of claim 14 further comprising periodically updating the comparing step and the generating step based on updated actual performance data.

21. The method of claim 20 further comprising periodically updating the comparing step and the generating step based on updated projected performance data.

22. A computerized system for determining the quality of an employee's performance which employee has responsibility for the performance of a production process comprising:
means for formulating projected performance projection data range for a production process from which an employee with responsibility for the production process can select projected performance data;
computer memory for storing data;
computer input means for inputting into the computer memory projected performance data corresponding to the production performance projection selected by an employee with responsibility for the production process;
means for obtaining actual performance data for the production process that can be compared with the projected performance data;
means for inputting the actual performance data into the computer memory; and
means for comparing the projected performance data with the actual performance data to determine an objective relation of the actual performance of the process to the projected performance of the process that is suitable for determining whether to reward the employee for a positive process performance relative to the projected performance data or to hold the employee accountable for a negative process performance relative to the projected performance data.

23. The system of claim 22 wherein said means for inputting projected performance data comprises a computer terminal.

24. The system of claim 22 wherein said means for inputting actual performance data comprises a computer terminal.

25. The system of claim 22 wherein the means for obtaining actual performance data comprises a production process data collecting device that is configured to obtain production process data in real-time.

26. The system of claim 25 wherein the data collecting device is configured to collect data selected from the group consisting of production line uptime, system rate, cases produced, overall yield, product loss at start-up, product loss at shut-down, by-product, remill, product quality, overpack, start-up, product changeovers, size changeovers, cleanup, downtime, case count, reason for downtime, rate of production data, product quality data, product running conditions, process quality data, personnel and staffing data, safety data, uptime data, overall yield data, loss at startup data, loss at shutdown data, product waste data, cleanup data and combinations thereof.

27. The system of claim 22 wherein the objective relation includes employee pay for process performance data and further comprising outputting means for outputting in a human readable format the objective relation including the data.

28. The system of claim 27 wherein said outputting means is configured to provide a human readable graphical output of the relation between the actual performance data and the projected performance data.

29. The system of claim 27 wherein the means for comparing includes means for comparing previous actual performance data with current performance data.

30. A computerized system for determining the quality of an employee's performance which employee has responsibility for the performance of a production process comprising:
computer memory for storing data;
a data collection device for collecting actual performance data;
a communication interface to enable the data collection device to transfer actual performance data collected by the data collection device to computer memory;
a computer display device communicating with said computer memory for displaying past actual production data, said past actual production data evaluated by an employee who participates in the production process to produce an employee production performance projection for a projection period;
a computer input device communicating with the computer memory for inputting projected performance data corresponding to the employee production performance projection; and
a computer processor for comparing inputted projected performance data with inputted actual performance data to determine the relation of the actual performance of the process to the employee projected performance of the process, said computer processor generating employee pay for process performance information based on said relation upon completion of the projection period.

31. The system of claim 30 wherein the data collecting device obtains production process data in real-time.

32. The system of claim 30 further comprising an output interface for providing the pay for performance information in a human readable format.

33. The method of claim 1 further comprising calculating employee pay for process performance value based on the relation between the actual performance of the process and the employee projected performance data of the process.

34. The method of claim 33 further comprising generating an employee scorecard having the employee pay for process performance information thereon.

35. The method of claim 34 wherein the employee pay for process performance information indicates whether the projected performance data has been achieved.

36. The method of claim 35 further comprising providing a monetary bonus to the employee when said employee pay for process performance information indicates that the projected performance data for the process has been achieved.

37. The method of claim 34 wherein the employee scorecard further comprises an exception report when said employee pay for process performance information indicates that the projected performance data has not been achieved.

38. The method of claim 37 further comprising identifying data points of the projected performance data that did not match the actual performance data.

39. The method of claim 1 further comprising evaluating past actual production data to determine the production performance projection.

40. The method of claim 1 wherein the production performance projection has a duration selected from the group consisting of a shift, a day, a week, a month, thirty days, sixty days, ninety days, six months and a year.

41. The method of claim 1 wherein a plurality of employees, each having a different responsibility in the production process, each determine a production performance projection.

42. The system of claim 22 wherein the means for formulating the projected process performance data range is selected from the group consisting of past actual production data, trade journals, government regulations, industry standards and combinations thereof.

43. The system of claim 22 wherein the objective relation employee pay for process performance information based on the relation between the actual performance of the process and the projected performance of the process.

44. The system of claim 27 wherein said pay for performance information indicates whether the production performance projection has been achieved.

45. The system of claim 44 wherein the outputting means generates an employee scorecard identifying the pay for performance information.

46. The system of claim 44 further comprising a monetary bonus for the employee when the pay for performance information indicates that the production performance projection has been achieved.

47. The system of claim 44 wherein said scorecard further comprises an exception report when the pay for performance information indicates that the production performance projection has not been achieved.

48. The system of claim 30 wherein the pay for performance information indicates whether the production performance projection has been achieved.

49. The system of claim 30 further comprising a monetary bonus for the employee when the pay for performance information indicates that production performance projection has been achieved.

50. A computerized method of determining the quality of an employee's performance which employee has responsibility for the performance of a production process comprising:

selecting a desired bonus amount to be received by an employee with responsibility for the production process;

inputting the desired bonus amount into a computer having memory;

generating with a computer a production performance projection corresponding to the desired bonus amount;

inputting projected performance data corresponding to the production performance projection into the computer memory;

inputting actual performance data into computer memory;

comparing with a computer the inputted projected performance data with the actual performance data to determine the relation of the actual performance of the process to the projected performance of the process; and providing the bonus amount to the employee when said relation indicates that the production performance projection has been met.

51. A computerized method of monitoring the performance of a production process comprising:

selecting an improvement factor indicating an amount by which the production process is to be improved by an employee with responsibility for the production process;

inputting the improvement factor into a computer having memory;

generating with a computer a production performance projection corresponding to the improvement factor;

inputting projected performance data corresponding to the production performance projection into the computer memory;

inputting actual performance data into computer memory;

comparing with a computer the inputted projected performance data with the actual performance data to determine the relation of the actual performance of the process to the projected performance of the process; and providing a reward to the employee when said relation indicates that the actual production process improved by at least the amount of the improvement factor.

* * * * *

UNITED STATES PATENT AND TRADEMARK OFFICE
CERTIFICATE OF CORRECTION

PATENT NO. : 6,681,197 B2
APPLICATION NO. : 09/755776
DATED : January 20, 2004
INVENTOR(S) : Steven F. Brunner and Craig A. Smith It is certified that error appears in the above-identified patent and that said Letters Patent is hereby corrected as shown below:

In the Abstract, on the title page (57), Line 1, after "method" insert -- is provided --

In the Drawings, Sheet 2, Fig. 2, the text of element 60, delete "IS PROJECTED PERFORMANCE LESS THAN ACTUAL PERFORMANCE?" and insert therefore -- IS ACTUAL PERFORMANCE LESS THAN PROJECTED PERFORMANCE? -- See Attached Col. 4, line 36, delete "reporting" and insert therefore -- data collection --
Col. 4, line 41, delete "reporting" and insert therefore -- data collection --
Col. 5, line 15, after "100" delete the comma
Col. 5, line 18, after "102" delete the comma
Col. 5, line 57, after "module" insert -- 40 --
Col. 6, line 32, after "through" insert -- forecast -- and after "input" delete "display"
Col. 7, line 36, delete "control" and insert therefore -- connection --
Col. 8, line 48, after "reports" insert a comma
Col. 8, line 65, after "constant" insert a comma
Col. 9, line 37, after "performance" insert -- in -- and after "which" insert -- the --
Col. 9, lines 58, 59, delete "projective" and insert therefore -- projected --
Col. 9, tine 61, delete "projective" and insert therefore -- projected --
Col. 10, line 34, after "performance" insert -- in -- and after "which" insert -- the --
Col. 11, line 19, after "performance" insert -- in -- and after "which" insert -- the --
Col. 12, line 14, after "performance" insert--in--and after "which" insert--the--
Col. 13, line 18, after "information" insert-- is --
Col. 13, line 43, after "performance" insert -- in -- and after "which" insert -- the --

Signed and Sealed this

Seventh Day of November, 2006

JON W. DUDAS
*Director of the United States Patent and Trademark Office*